United States Patent [19]

Edwardson

[11] 4,233,850
[45] Nov. 18, 1980

[54] HAND TOOL
[75] Inventor: Svante R. Edwardson, Solna, Sweden
[73] Assignee: AB Dentatus, Hagersten, Sweden
[21] Appl. No.: 940,363
[22] Filed: Sep. 7, 1978
[30] Foreign Application Priority Data
  Sep. 14, 1977 [CH] Switzerland ............ 102986/77
[51] Int. Cl.³ .................................. F16H 21/22
[52] U.S. Cl. ................................. 74/44; 74/600;
  74/603
[58] Field of Search ............... 74/44, 600, 603;
  51/170 TL

[56] References Cited
U.S. PATENT DOCUMENTS
2,690,081 9/1954 Björklund et al. ......... 74/603 X
3,007,230 11/1961 Riedl ....................... 74/44 X
3,626,768 12/1971 Dancsik .................... 74/600 X FOREIGN PATENT DOCUMENTS
134791 3/1952 Sweden .
140264 5/1953 Sweden .

Primary Examiner—William H. Schultz
Attorney, Agent, or Firm—Young & Thompson

[57] ABSTRACT

A hand tool comprising two moving parts; a rotating and a reciprocating part. The reciprocating part, carrying a machining tool, is imparted its movement from the rotating part via a crank mechanism with variable excentricity for adjusting the reciprocating part's length of stroke. A crank pin in said mechanism is therefore excentrically disposed on a rotatable, lockable slide excentrically journalled in a rotatable holder which is imparted its rotary movement from the drive means of the hand tool. Counterweights in the slide and its holder together counterbalance the movements of the reciprocating part corresponding to the varying lengths of stroke. Upon setting of the crank mechanism to the desired length of stroke, the counterweights are arranged to either work in conjunction or in opposition and are therefore rotatable relative each other to an extent corresponding to the relative movements of the slide and slide holder.

1 Claim, 6 Drawing Figures

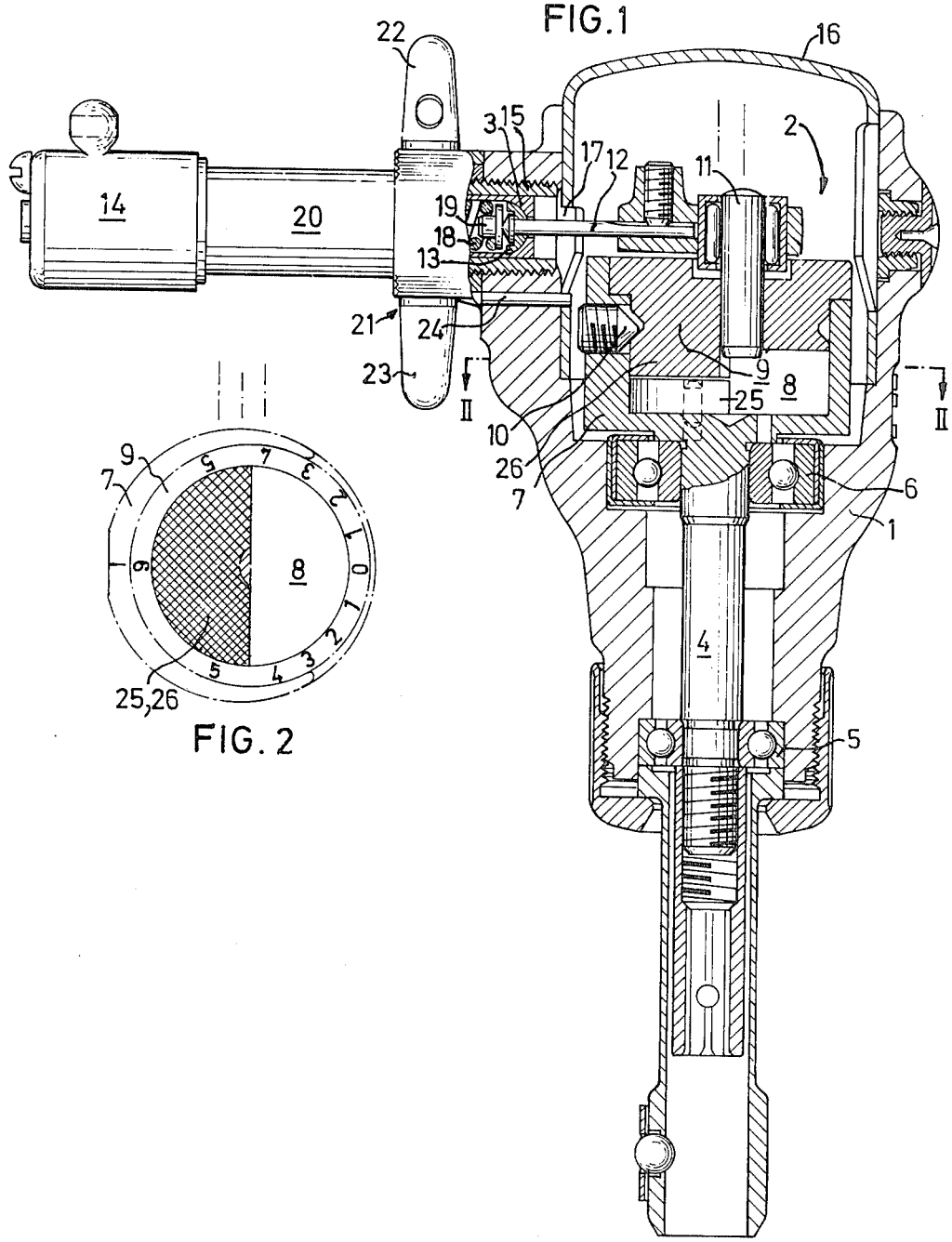

HAND TOOL

The present invention relates to a hand tool of the type comprising two moving parts, namely a rotating part and a reciprocating part, the latter part being intended to carry a machining tool and being imparted its movement from the former rotating part via a crank mechanism with variable excentricity for adjusting the length of stroke of the reciprocating part, for which purpose a crank pin in the crank mechanism is excentrically disposed on a rotatable slide which can be locked fast in various positions, said slide being in turn excentrically journalled in a rotatable slide holder which is disposed to be imparted a rotating movement from the drive means of the hand tool.

Similar hand tools are previously known, for example by Swedish Pat. No. 134,791, and are primarily intended for filing, grinding and similar work. The reciprocating part carrying the machining tool is suitably and, in accordance with the prior art according to Swedish Pat. No. 140,264, rotatable around an axis parallel to the direction of motion of the same independently of the reciprocating movement. Thus the machining tool can either be controlled manually so that it carefully follows the shape of the machined object or, as is especially the case when using flat machining tools, it can be allowed to turn freely so that it automatically assumes its position in the machining plane by being guided against the machined surface. Furthermore the reciprocating part can also be set to arbitrary rotational angles. By virtue of the fact that the reciprocating part, and thereby the machining tool also, are rotatable, this makes hand tools of this type easy to operate and work with. They have consequently been used extensively in various fields, especially in filing and grinding work on objects of complicated and varying shape.

Even though the rotating part with its accompanying crank mechanism in the known hand tools is counterbalanced at all settings of the rotatable slide by the position of masses, which counterbalance each other in relation to the axis of rotation, being changed at the same time as the crank pin is set and in such a manner that the moment of inertia of the rotating part of the crank mechanism with respect to the axis of rotation is always offset by the moments of inertia of the counterbalancing masses with respect to the same axis, this counterbalancing has not proven entirely satisfactory for the hand tool as a whole. Vibrations occur in the known hand tools which apparently stem from the fact that the reciprocating part and the machining tools carried thereby are not dynamically counterbalanced sufficiently to substantially eliminate vibrations from the hand tool and make it comfortable to use within the limits of the length of stroke for the reciprocating part and within the range of sizes of the machining tools.

Thus the purpose of the invention is to achieve a hand tool while retaining an anatomically at least substantially correct design with regard to shapes, sizes and weights, of the type disclosed here by way of introduction, in which the reciprocating part with the machining tool is dynamically counterbalanced to a sufficient degree so that the hand tool is substantially free of vibration and comfortable to hold even while working at the longest lengths of stroke and with machining tools of widely varying sizes and weights.

This purpose has been achieved, as operational tests have shown, by providing the hand tool according to the invention with counterweights in the rotatable slide holder and in the slide rotatable therein. Said weights provide a counterbalancing, corresponding to the various lengths of stroke, of the movements of the reciprocating part and are arranged, upon setting of the crank mechanism for the desired length of stroke to act either in conjunction or in opposition and are therefore movable in relation to each other to an extent corresponding to the relative movements of the slide and the slide holder.

An especially simple counterbalancing arrangement is achieved if the counterweights according to the invention are securely joined to the slide and the slide holder respectively and are rotatable relative to one another by the slide being rotatable in the slide holder. The simplest method of enabling the weights to work either in conjunction or in opposition is to have them rotatable in relation to one another in adjacent parallel planes which overlap one another.

In an especially simple and advantageous embodiment of a hand tool according to the invention, the counterweights are in the shape of semicircular discs, one of which is made as one piece with the slide and is located at the interior end of the slide inside the slide holder, and the other is attached at the bottom of a space in the slide holder for the slide.

The invention shall be described in more detail in the following while referring to the accompanying drawings showing an appropriate embodiment of the same.

FIG. 1 in the drawings shows a longitudinal section through the hand tool according to the invention with two moving parts, the rotating part and the reciprocating part, in the positions they assume at the maximum extent of the latter part in one direction.

FIG. 2 is a partical cross section along the line II—II in FIG. 1 showing the positions in which the counterweights for balancing the motion of the reciprocating parts for the maximum length of stroke.

Figure 5:
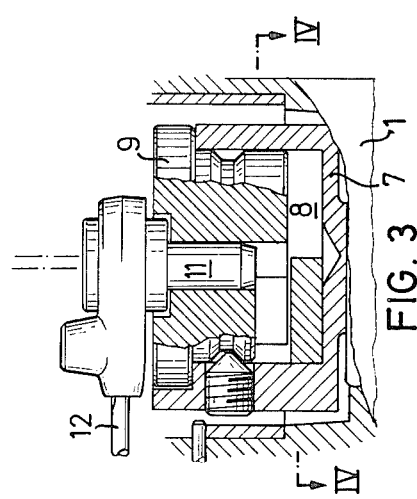
FIG. 5 is a partial longitudinal section through the rotating part of the hand tool in the position it assumes at a zero length of stroke for the reciprocating part.
Figure 6:
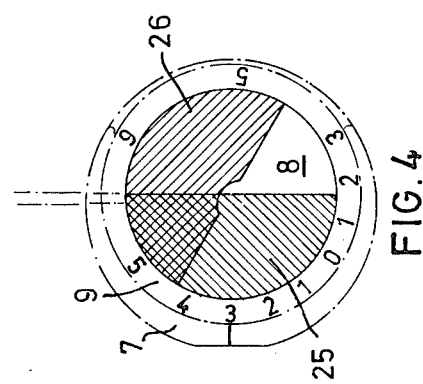

FIG. 6 finally is a cross section along the line VI—VI in FIG. 5 showing the relative positions of the counterweights with a zero length of stroke for the reciprocating part.

It can be seen from the embodiment of the invention shown in the drawings that the hand tool suitably has a pistol shape and comprises a casing 1, containing the two moving parts of the tool, the rotating part 2 and the reciprocating part 3. Via an axial shaft 4, extending out of the casing 1 and possibly surrounded by a protective casing, the tool can be coupled to a suitable drive means, for example a flexible axle driven by an electric motor. The axial shaft 4 is made in one piece with a slide holder 7 journalled through ball bearings 5,6 in the casing 1 for rotational movement. In a space 8 in the slide holder a turning slide 9 is excentrically journalled and is lockable in arbitrary angular positions in relation to the slide holder 7 by means of a locking screw 10 threaded in the slide holder. There is in turn an axial bore excentrically located in the slide and holding a crank pin 11. This is included in a crank mechanism which has variable excentricity as a result of the excentric position of the crank pin 11 in the slide 9 and the excentric position of the slide and the ability to set it at arbitrary angular positions in the slide holder 7. In addition to the crank pin 11 the crank mechanism also includes a connecting rod 12 rotationally journalled on the pin. Said rod is joined via a ball bearing 13 to one end of the reciprocating part 3 of the tool. This part is a holder for the machining tool which it carries in a socket 14 at its opposite end. More precisely, the reciprocating part or the machining tool holder 3 extends radially from the upper portion of the casing 1, in which a cylindrical bushing 15 is threaded and locked in a suitable manner to fuction as a guide for the reciprocating part 3 which is axially displaceable inside this bushing 15. The space in the casing 1 containing the crank mechanism is covered by a cover 16, the edge portion of which extends into the casing and is provided with an opening 17 through which the connecting rod 12 extends. The connection of the connecting rod to the reciprocating part or tool holder 3 has the form of a universal joint flexible in the longitudinal direction of this part 3. Said joint is formed by a means provided with a spherical surface, which transmits the reciprocating part and the connecting rod and is located in a central bore in said part. A helical spring 18 is placed in the bore and presses the said means against a corresponding spherical bottom surface in the tool holder 3. The connection between the part or holder 3 and the connecting rod 12 is made by said means by a flange or head on the end of the connecting rod 12 being clamped between the means in question and a piston 19 urged by the spring 18. In order to facilitate rotation of the reciprocating part 3 in the cylindrical bushing 15, said flange or head is provided with a central point which rests against the end surface of the spring-loaded piston 19.

A rotatable sleeve 20 is arranged outside the cylindrical bushing 15, said sleeve being broader at its front end and extending forwards around the reciprocating part or tool holder 3, from which a radially extending part (not shown) protrudes into a longitudinal groove (not shown) in the wider portion of the sleeve 20. The sleeve is prevented from moving axially by its supporting member being placed between a lock nut (not shown) and an edge flange (not shown) at the front end of the bushing 15.

In order to be able to turn the machining tool by hand when working with the hand tool, a maneuvering means 21 is arranged on the sleeve 20 which is rotatable in relation to the casing 1. The maneuvering means has a cylindrical bore, through which the sleeve 20 is inserted, and a slot (not shown) going out from the bore, so that the means can be clamped tightly to the sleeve by means of a clamping screw 22, whose extended portion serves as a handle. Opposite said handle on the opposite side of the maneuvering means there is a similar handle 23 arranged coaxially with said clamping screw. Thus the maneuvering means can be locked securely at arbitrary angular positions relative to the rotatable sleeve 20, and when not clamped it can be moved axially along the sleeve. When the maneuvering means is close to the casing 1, it can be locked in a certain angular position by a pin 24 anchored in the casing, said pin penetrating into a slot (not shown) in the operating means.

During its stroke movements the reciprocating part 3 is guided in the groove (not shown) in the broadened outer end of the sleeve 20 so that its angular position remains unchanged if the position of the rotatable sleeve remains unchanged. If a flat machining tool is used, the machining can thus be performed in a specific plane determined by the setting of the tool. If the rotatable sleeve 20 is released on the other hand by loosening the clamping screw 22, the reciprocating part 3 can assume an arbitrary angular position which is determined by the surface which is being machined, as the flat tool is advanced and guided by the surface and which is independent of the position of the hand tool as a whole. The plane surface of the machining tool will thus automatically be set in the machining plane.

If, on the other hand, the maneuvering means is locked to the rotatable sleeve in such a position that the pin 24 is not in the corresponding slot in the maneuvering means, the rotatable sleeve 20, and with it the angular setting of the reciprocating part or tool holder 3, can be varied manually during operation by acting on the maneuvering means 21 and its handles 21 and 22. The hand tool can be held in the hand in such a way that the index finger is placed on handle 22 and the middle finger is placed on handle 23. The maneuvering means can be moved axially on the rotatable sleeve 20 and be locked in the position which in each individual case is suited to the length of the fingers.

If during operation, the machining tool should meet with abnormally great resistance, the spring 18 is depressed so as to avoid damage to the machining tool and the mechanism of the hand tool.

It is evident from the construction that the rotating part 2 of the hand tool comprises the slide holder 7 and the turning slide 9 excentrically mounted therein, while it is the tool holder 3 which is the reciprocating part of the hand tool. Furthermore it is evident from the construction that the reciprocating part 3 is imparted movement from the rotating part via the crank mechanism consisting of the crank pin 11 and the connecting rod 12. Said mechanism is variably excentrically settable to achieve the desired lengths of stroke of the reciprocating part 3. For this purpose the crank pin 11 in the crank mechanism is excentrically arranged on the rotatable turning slide 9 which can be locked in different positions, and which in turn is excentrically journalled in the rotatable slide holder 7 acted on by the hand tool drive means.

According to the invention, counterweights in the form of semicircular discs 25,26 are disposed in the slide holder 7 and the rotatable slide 9 respectively in order to achieve together a counterbalancing, corresponding to the varying lengths of stroke, of the movements of the reciprocating part 3. The counterweight 26 disposed in the slide 9 is made, in the embodiment shown here, in one piece with the slide and is located at the inner end of the slide in the slide holder, while the other counterweight 25 in the slide holder is a separate part which is located at and is fastened to the bottom of the space 8 in the slide holder 7 for the turning slide 9. This arrangement of the counterweights joins them securely to the slide and the slide holder respectively and at the same time allows them to rotate in relation to one another by turning the slide in the slide holder. Furthermore, the counterweights 25,26 are thereby movable in relation to each other in two adjacent parallel planes in which the counterweights can either lie besides one another or can be partially or entirely overlapping as dictated by the setting of the turning slide 9 in the slide holder 7 for obtaining the required excentricity of the crank mechanism for achieving the desired length of stroke.

Figure 3:
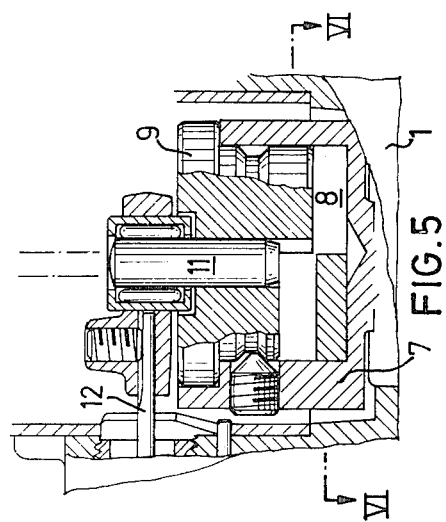
FIG. 3 is a partial longitudinal section through the rotating part of the hand tool in the position it assumes at one end position of the reciprocating part at half of the maximum length of stroke.
Figure 4:
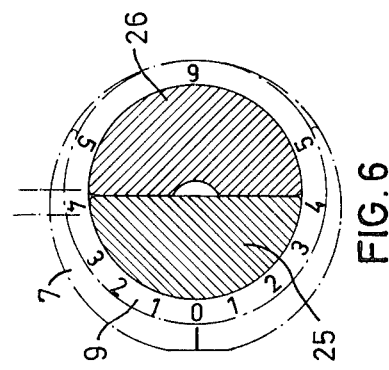
FIG. 4 is a partial cross section along the line IV—IV in FIG. 3 showing the relative positions of the two counterweights at said end position of the reciprocating part set for a stroke length which is half of the maximum.

FIGS. 1 and 2, 3 and 4, and 5 and 6 show the positions which the counterweights 25,26 have at the extension of the reciprocating part 3 in one direction of stroke. FIGS. 1 and 2 show the positions at the maximum length of stroke, FIGS. 3 and 4 at half length and FIGS. 5 and 6 at length of stroke zero. In FIGS. 2,4 and 6, those portions of the two counterweights 25, 26 which do not overlap one another are marked with parallel lined patterns, while the overlapping parts are marked with a crossed pattern, so the extent of overlap can be seen. As is evident from the relative positions of the counterweights 25,26 in the figures, the counterweights according to the invention are disposed upon setting of the crank mechanism for obtaining the desired length of stroke to work either in conjunction or in opposition to achieve together a counterbalancing, corresponding to the various lengths of stroke, of the movements of the reciprocating part 3. For this purpose, the counterweights are rotatable in relation to one another to an extent corresponding to the relative movements of the turning slide 9 and the slide holder 7.

The hand tool described here and shown in the drawing is only to be taken as an example and the invention can, of course, be varied in numerous ways within the scope of the following claims.

What I claim is:

1. Hand tool, comprising two moving parts, specifically a rotating part (2) and a reciprocating part (3), the latter part (3) being intended to carry a machining tool and receiving its movement from the first-mentioned rotating part (2) via a crank mechanism (11,12) with variable eccentricity for adjusting the length of stroke of the reciprocating part, for this purpose a crank pin (11) in the crank mechanism being eccentrically disposed on a rotatable slide (9) which can be locked fast in various positions, said slide being in turn eccentrically journalled in rotatable slide holder (7) which receives rotating movement from the drive means of the hand tool, characterized in that counterweights (25,26) are disposed in the slide holder (7) and in the slide (9) in order to achieve together a counterbalancing, corresponding to the varying lengths of stroke, of the movements of the reciprocating part (3), said counterweights (25,26) being disposed, upon setting of the crank mechanism (11,12) in order to obtain the desired length of stroke, to either work in conjunction or in opposition, and are therefore rotatable relative to one another to an extent corresponding to the relative movements of the slide (9) and the slide holder (7), the counterweights (25,26) being securely joined to the slide (9) and the slide holder (7) respectively and being rotatable relative to one another by the slide being rotatable in the slide holder, the counterweights (25,26) being rotatable relative to one another in adjacent parallel planes, which overlap one another, the counterweights (25,26) having the form of semicircular discs, one (26) of which is made as one piece with the slide (9) and is located at the interior end of the same in the slide holder (7), and one (25) of which is located and fastened in the bottom of a space (8) in the slide holder (7) for the slide (9).

* * * * *